Figure 1:
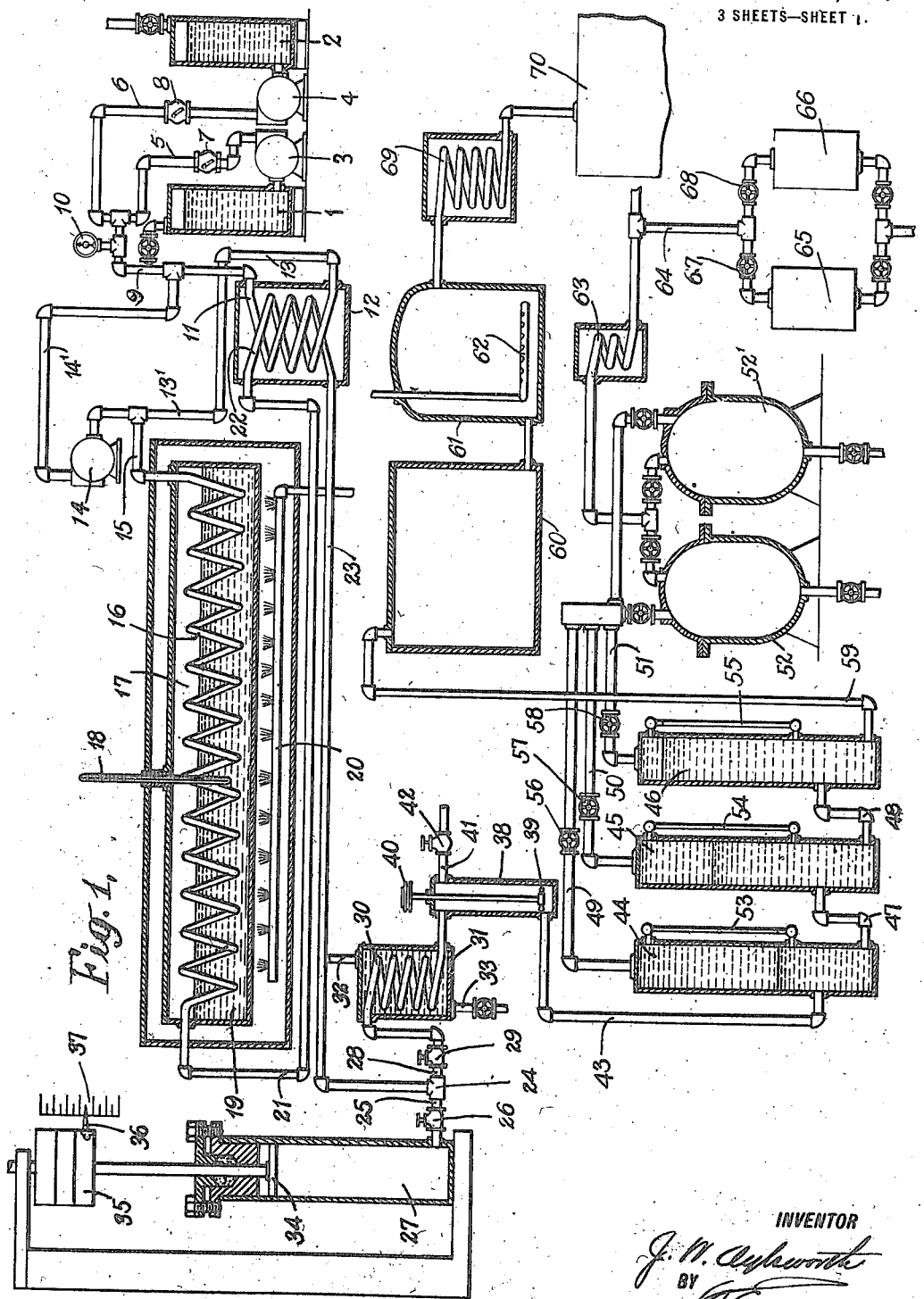

J. W. AYLSWORTH, DEC'D.
A. M. AYLSWORTH AND THE SAVINGS INVESTMENT AND TRUST COMPANY, EXECUTORS.
APPARATUS FOR ORGANIC CHEMICAL REACTIONS.
APPLICATION FILED JAN. 24, 1916.

1,213,143.

Patented Jan. 23, 1917.
3 SHEETS—SHEET 1.

INVENTOR
BY
ATTORNEYS

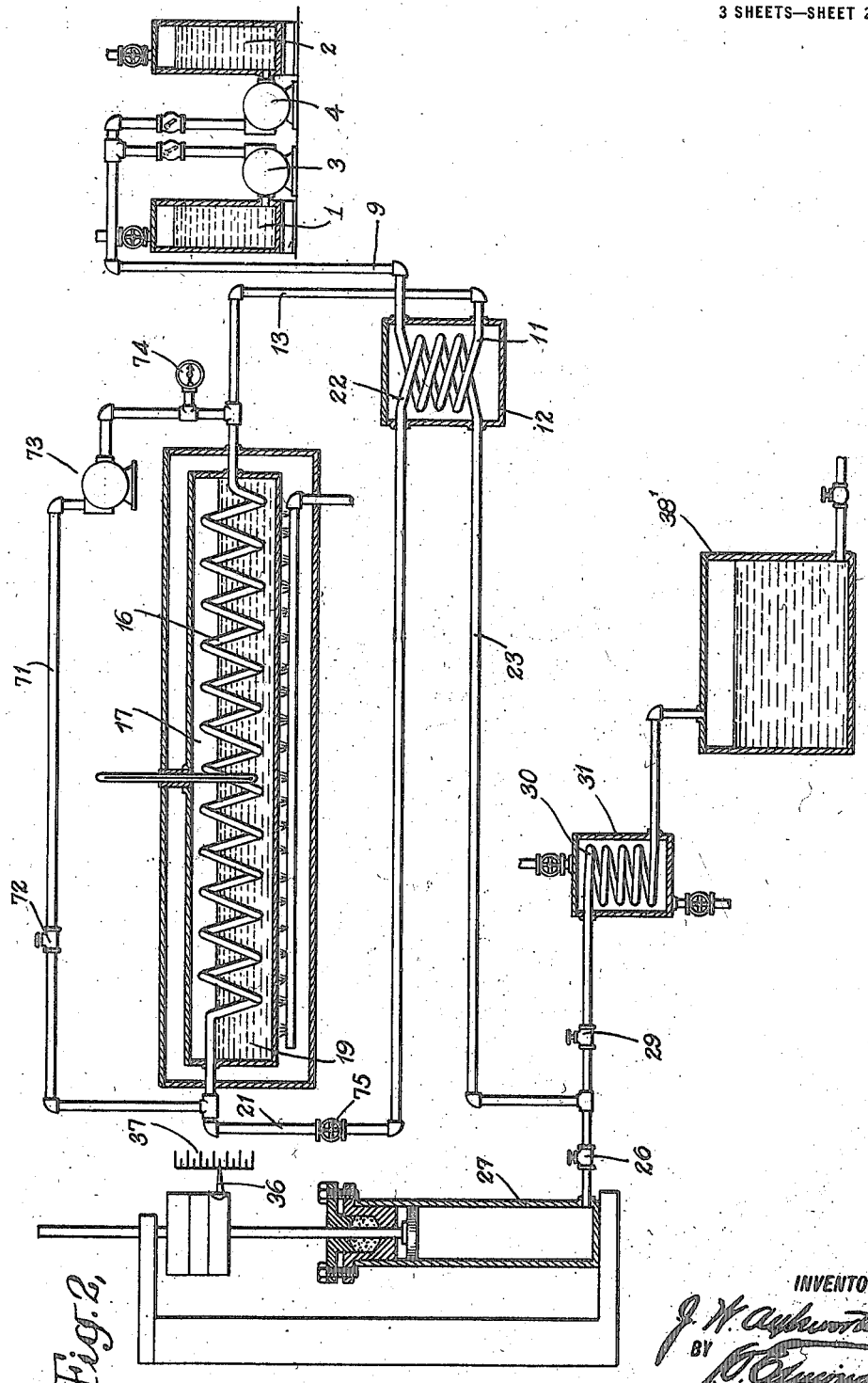

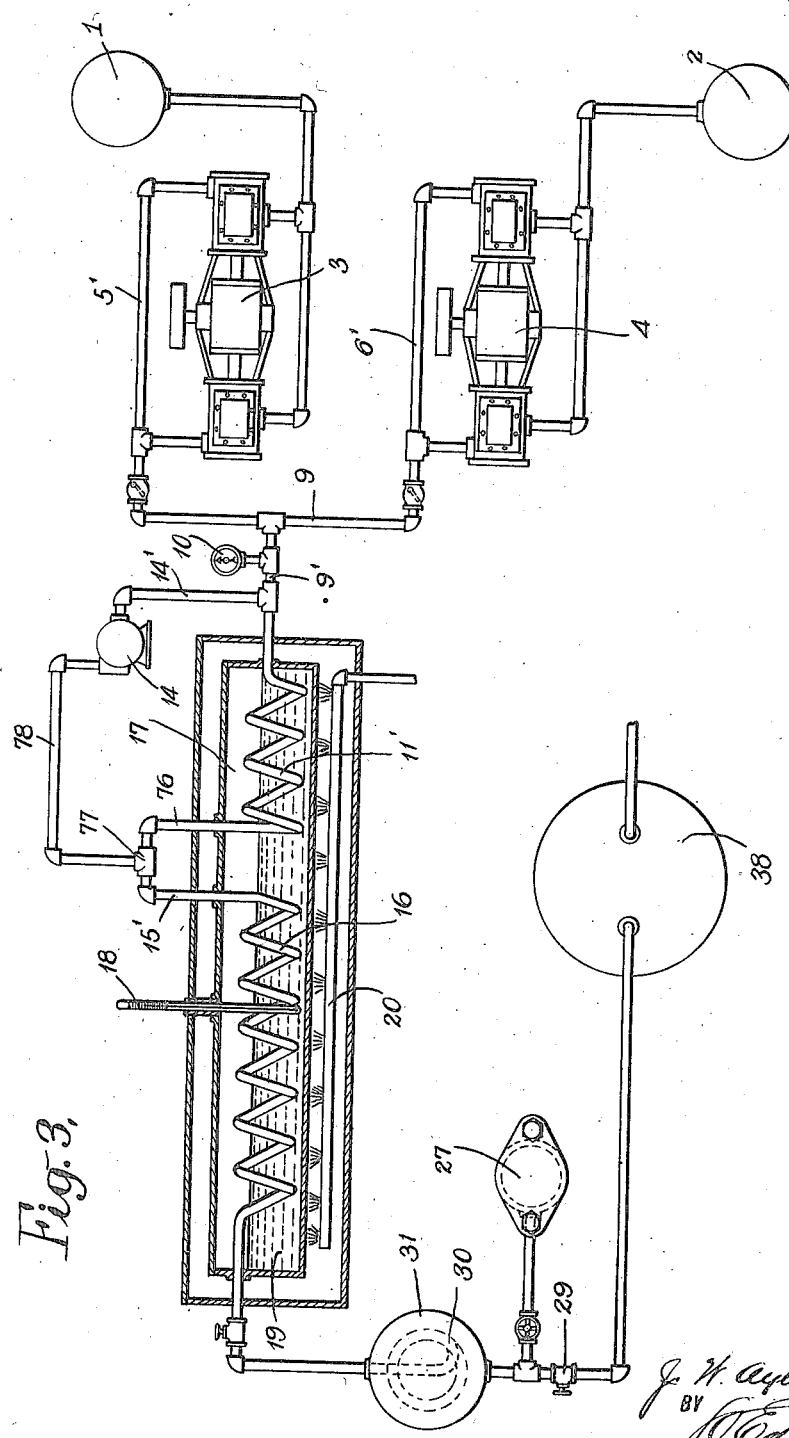

UNITED STATES PATENT OFFICE.

JONAS W. AYLSWORTH, OF EAST ORANGE, NEW JERSEY; ADELAIDE M. AYLSWORTH AND THE SAVINGS INVESTMENT AND TRUST COMPANY, OF EAST ORANGE, EXECUTORS OF SAID JONAS W. AYLSWORTH, DECEASED.

APPARATUS FOR ORGANIC CHEMICAL REACTIONS.

1,213,143. Specification of Letters Patent. Patented Jan. 23, 1917.

Application filed January 24, 1916. Serial No. 73,827.

*To all whom it may concern:*

Be it known that I, JONAS W. AYLSWORTH, a citizen of the United States, residing at East Orange, in the county of Essex and State of New Jersey, have invented certain new and useful Improvements in Apparatus for Organic Chemical Reactions, of which the following is a specification.

My invention relates to improved apparatus for performing organic chemical reactions at elevated temperatures and high pressures.

My object is to provide means whereby certain reactions of the character referred to may be carried on effectively and evenly, and under control without danger from explosion, and at the same time at relatively moderate expense.

An example of the character of reaction referred to is found in my application Serial No. 73,826, "production of phenol and other substances", filed January 24, 1916, describing particularly processes for manufacturing phenol from benzene.

It is usual to perform reactions of the character mentioned, where the pressure is not above five hundred to eight hundred pounds per square inch, in autoclaves or closed digesters, but when pressures above eight hundred pounds per square inch are required the cost of construction becomes excessive, and as the pressure increases it becomes more and more difficult to construct digesters or autoclaves of sizes required for large commercial operation. Also, the danger of disastrous explosions is such as to prevent the use of such apparatus.

My improved apparatus involves essentially the use of a heated coil, through which the reacting fluids are forced by means of pumps, either continuously or intermittently. The reaction-coil may readily be made of sufficient strength to withstand from five thousand to ten thousand pounds per square inch of pressure, or greater, in sizes up to three inch or four inch diameter of pipe in the coil and of sufficient length to insure practically any required length of time for reaction in a continuous or intermittent process. Smaller sizes of pipe will allow proportionately higher pressures. I am aware that coils have been used for such reactions, such apparatus being shown, for example, in my Patent No. 666,636, granted January 29th, 1901. Apparatus of this character which has previously been proposed, however, has always been subject to certain difficulties, and the aim of the present invention is to overcome the same for the purposes mentioned. It may be stated that the reactions for which the present apparatus is especially adapted are those in which hydrocarbons or derivatives thereof are hydrolized, as in the manufacture of phenol and derivatives from benzol, naphthols from naphthalene, and many other similar reactions. I may also mention esterification reactions, and the production of anilin oil and some of the derivatives of the same. My improved apparatus may also be used in the hydrolysis of fats, and for a wide variety of reactions such as are ordinarily produced in closed digesters or autoclaves.

In order that a clearer understanding of my invention may be had, attention is hereby directed to the accompanying drawings, forming part of this application and illustrating certain embodiments of my invention.

In the drawings, Figure 1 represents a diagrammatic view of apparatus to be used in a continuous process, parts of the same being represented in vertical section and parts in side elevation; Fig. 2 is a similar view, representing a modification of my invention in which the apparatus is adapted for either intermittent or continuous operation; and Fig. 3 is a similar view, representing a modified form of apparatus intended for use in a continuous process, parts of the apparatus being shown in plan view and parts in section.

Referring to the drawings and particularly to Fig. 1, a pair of supply-tanks 1 and 2 are shown, from which liquid is withdrawn by separate pumps 3 and 4, which deliver liquid through pipes 5 and 6, which lead into a single pipe 9. Pipes 5 and 6 are provided with check-valves 7 and 8, and a hydraulic pressure-gage 10 may be mounted on pipe 9. It is to be understood that ordinarily a separate supply-tank, such as 1 or 2, is provided for each one of the ingredients, which are to be subsequently caused to react, with a separate pump for each such tank. Pumps 3 and 4, and the additional pumps as well if there are more than two reagents contained in separate compartments, are so proportioned as to feed the required quantity of each substance in a continuous manner, so that the proper proportioning of the reacting substances is assured. This arrangement has the further advantage that packing may be provided for one pump different from that provided for the other, so that a fluid which would attack the packing in one will be in contact only with the other. For example, in the manufacture of phenol from chloro-benzene, for which the apparatus illustrated in Fig. 1 is well adapted, one of the tanks 1 and 2 may contain chloro-benzene and the other sodium hydrate solution, in which case one of the pumps may be provided with rubber packing for the alkali solution, and the other with leather packing for the chloro-benzol. If the substances referred to were initially mixed and forwarded by a single pump, it would be difficult to provide a form of packing for the pump which would not be attacked by either the alkali or the benzol derivative.

The reacting ingredients which meet in pipe 9 are forwarded to the reaction-coil 16, which is heated as will be described hereinafter. It is usually necessary, however, to thoroughly mix the substances before they reach the reaction-coil, and it is usually advisable to give the same a preliminary heating. In the apparatus shown in Fig. 1, pipe 9 leads into a mixing coil 11 in a chamber 12, which may contain a heating bath of oil or the like. The exit end of the coil 11 is connected to pipe 13, the continuation of which 13', leads to an additional pump 14. Pump 14 delivers into pipe 14', which leads back to pipe 9, so that a closed mixing circuit is provided through which the mixed liquids rapidly and repeatedly circulate. A pipe 15, connected to pipe 13' by a T connection, leads to the reaction-coil 16, so that a certain part of the circulating fluid in the mixing circuit continually flows from the latter to the reaction-coil. The mixed liquid is forced out from the mixing circuit through pipe 15 at the same rate that fresh mixture is supplied to the mixing circuit by pumps 3 and 4.

Reaction-coil 16 is contained within a vessel 17, which may be provided with a thermometer 18 extending into a heating bath 19 which nearly covers the convolutions of the coil within tank 17. Bath 19 is heated by gas supplied by pipe 20 or by other suitable heating means. Bath 19 may be composed of a fusible metal, such as lead or tin, or a suitable alloy, or a salt which will remain fluid at the desired temperatures. Temperatures which are required in the use of my improved apparatus often range from 300° C. to 400° C., and a bath of the character mentioned is of the greatest utility in providing a uniform heat throughout the length of the coil. Hot air or vapor baths have proved insufficient for this purpose in practice. For many purposes, I find that a bath of nitrite of soda is the best adapted. This salt fuses at 213° C. and may be used at any temperature between 213° C. and 390° C. without decomposing, and when molten is very thinly fluid, so that uniformity of temperature by circulation and convection is assured. The described use of nitrite of soda as a heating bath has not previously been disclosed, to my knowledge, and was found as the result of considerable research, since this substance is described by authorities simply as melting at 213° C. and decomposing at higher temperatures.

The reacted material leaves coil 16 by pipe 21, which enters chamber 12 and passes as a coil 22 through the oil bath in the same, the material in coil 22 flowing thence through pipe 23. The heating bath in chamber 12 is thus heated by the otherwise waste heat contained in the reacted liquid which has passed through the reaction-coil 16, so that the initial substances passing through coil 11 and the mixing circuit are given a preliminary heating, as well as being thoroughly mixed. This mixing is especially valuable in the case of reagents such as chloro-benzene and sodium-hydrate, which are not mutually soluble.

Pipe 23 leads to a T connection 24, which is connected by pipe 25 provided with valve 26 to a hydraulic accumulator 27. T connection 24 is also connected by pipe 28, which is provided with a needle-valve 29, to a cooling coil 30 contained in a tank 31 through which cold water may be caused to pass, entering by pipe 32 and leaving by pipe 33. Accumulator 27 is provided with a plunger 34, which carries weights 35, the plunger or the weights being provided with a pointer 36 playing over a scale or dial 37.

Pumps 3 and 4 are intended to supply liquid to the system at a pressure greater than the vapor tension of the reacting substances at the temperatures employed, which pressure may be indicated by gage 10. Valve 29 may be opened sufficiently to cause flow therethrough at the same rate that liquid is supplied the system by pumps 3 and 4. Manual control of valve 29 may be governed with reference to indicator 36, since when the indicator rises valve 29 should be opened more widely and vice versa. The provision of the accumulator insures that the coil 16 shall at all times be filled completely with an evenly moving fluid and that there shall be no sudden variations of pressure therein in case valve 29 is not quickly adjusted to compensate for any possible increase or decrease in the rate at which the liquid is pumped.

From the cooling coil 30, the liquid may flow to a tank 38, which in some cases may be provided with a stirrer 39 rotated by a belt connection 40 or the like. In some cases, as in the manufacture of phenol, tank 38 may also be provided with a pipe 41 provided with valve 42, through which a suitable acid or other reagent may be introduced into the liquid in tank 38.

In case a substance is being prepared, such as phenol, which will separate from the solution in which it is contained and float above the same as a liquid, a series of separators 44, 45 and 46 may be provided, the first of which is connected with tank 38 by a pipe 43. The lower portions of the separators, containing in some instances a salt solution, are connected by pipes 47 and 48, and the upper portions of the separators, containing the desired liquid product, may be connected by pipes 49, 50 and 51 with a vacuum-still, or with a pair of vacuum-stills, 52 and 52′, one of which may be used while the other is being emptied. The separators are provided with gages or glasses 53, 54 and 55, so that the levels of the separated liquids may be determined. Pipes 49, 50 and 51 are provided with valves 56, 57 and 58.

In the case of a product such as phenol, the latter passes from the vacuum-still through a condenser 63 and pipe 64, to one of a pair of receivers 65 and 66, the pipe connections to which are provided with valves 67 and 68. The salt solution or other liquid contained in the lower portions of the separators may be caused to pass through a pipe 59 to a receiver 60, from which it may pass into a boiler 61, provided with a perforated steampipe 62. In the production of phenol or the like, steam blown through the liquid in boiler 61 carries any traces of phenol or other substance to be recovered therefrom into a condenser 69 and thence into a receiver 70.

The apparatus illustrated in Fig. 2 is intended for use in either an intermittent or a continuous process. The mixed liquids passing through the mixing and heating coil 11 pass through pipe 13 to the reaction-coil 16, which is heated in the same manner as before. Pipe 21 leading from the reaction-coil is provided with a valve 75, and pipes 13 and 21 adjacent the two ends of the reaction-coil are joined by a pipe 71 passing around tank 17 and provided with a valve 72, separate pump 73 and a hydraulic gage 74. In an intermittent process, valve 75 is closed and valve 72 opened, whereupon the reacting mixture is circulated through coil 16 and pipe 71 for a length of time sufficient to complete the reaction desired, whereupon valve 72 is closed and valve 75 opened, resulting in the progression of the liquid through coil 22 in chamber 12, thus heating the oil bath therein. Obviously, the apparatus may be used in the same continuous fashion as that illustrated in Fig. 1, by keeping valve 72 closed and valve 75 open. Or, if desired, valve 72 may be opened and valve 75 opened sufficiently to permit liquid to flow continuously therethrough at a desired rate while a portion of the material passing through coil 16 repeatedly circulates through pipe 71 and coil 16. In other respects this apparatus is or may be the same as that illustrated in Fig. 1. The apparatus may end with tank 38′, or, if necessary, the separators, stills and other apparatus illustrated in Fig. 1 may additionally be used.

A further modification is illustrated in Fig. 3. Here the mixing coil 11′ is illustrated as being contained within one end of the tank 17, in which the reaction-coil 16 is also contained. In this case, the heating bath 19 surrounds the convolutions of the mixing coil 11′, as well as those of the reaction-coil 16. In this figure, the pumps 3 and 4 are shown in greater detail than in the preceding figures as being preferably double-acting, reciprocating pumps, which draw liquid from tanks 1 and 2 and force the same through pipes 5′ and 6′ into the pipe 9, which is connected by a T connection and a pipe 9′ with the coil 11′. Coil 11′ is connected by pipe 76, T connection 77 and a pipe 78, with the pump 14, and thence by pipe 14′ back to the pipe 9′ at the beginning of coil 11′. T connection 77 is connected by pipe 15′ with coil 16, so that coil 11′, together with pipes 76, 78 and 14′, constitutes a mixing and heating circuit in the same manner as that shown in Fig. 1, liquid leaving the same through pipe 15″ at the same rate that liquid is forced into the mixing circuit by pumps 3 and 4. The rest of the system may be the same as in the cases already described.

It should be understood that my invention is not strictly limited to the exact details illustrated and described above, but is as broad as is indicated by the accompanying claims.

Having now described my invention, what I claim as new therein and desire to secure by Letters Patent is as follows:—

1. In chemical reaction apparatus, the combination of a plurality of receptacles, a pump for withdrawing liquid from each receptacle, a mixing coil, a reaction coil, and connections between said pumps and said mixing coil, and between said mixing coil and said reaction coil, substantially as set forth.

2. In chemical reaction apparatus, the combination of a mixing coil, a reaction coil, means for heating the latter, a source of supply, a chamber surrounding said mixing coil, and connections for leading fluid material from said source, through said mixing coil and reaction coil, and thence into said chamber, to heat the material in said mixing coil, substantially as set forth.

3. In chemical reaction apparatus, the combination of a reaction coil, means for pumping liquid through the same, means for heating the same, a pipe leading from said coil, a hydraulic accumulator connected to said pipe, a receiver, a pipe connection leading to said receiver from said pipe, and a valve in said pipe connection, substantially as set forth.

4. In chemical reaction apparatus, the combination of a source of supply, a reaction chamber, a mixing coil, pipe connections joined to the ends of the mixing coil, to complete a circuit therewith, means for causing liquid to flow into and circulate through the mixing circuit, and a connection from one of said pipe connections to said reaction chamber, to permit liquid to flow to said chamber as liquid flows into said mixing circuit from said source, substantially as set forth.

5. In chemical reaction apparatus, the combination of a source of supply, a reaction coil, a connection between the same, a pipe leading from the exit end of said coil, having a valve therein, pipe connections joined to the ends of the said coil, to complete a circuit therewith, a valve in said pipe connections, and means for causing liquid to flow from said source through said reaction coil, and said pipe connections, repeatedly, when said first valve is closed and said second valve is open, substantially as set forth.

6. In chemical reaction apparatus, the combination of a reaction coil, means for maintaining the same at a desired temperature, means for forcing reacting liquids therethrough under a pressure greater than the vapor tension, at the temperature used, of the reagents, a pipe leading from said coil, and a valve in said pipe, substantially as set forth.

7. In chemical reaction apparatus, the combination of a reaction chamber, means for heating the same, a cooling coil connected therewith, a mixing tank connected with said coil, and a separator tank connected with said mixing tank, having means for drawing off the upper liquid, substantially as set forth.

8. In chemical reaction apparatus, the combination of a reaction chamber, a series of separator tanks connected therewith, connections between the lower portions of said tanks, pipes provided with valves leading from the upper portions of said tanks, a pipe connection from the lower portion of the last tank, and indicating means for showing the line of separation between an upper and a lower liquid in each tank, substantially as set forth.

This specification signed and witnessed this 21st day of January, 1916.

JONAS W. AYLSWORTH.

Witnesses:
DYER SMITH,
I. McINTOSH.